US012632907B2

(12) United States Patent
Kumar et al.

(10) Patent No.: US 12,632,907 B2
(45) Date of Patent: May 19, 2026

(54) INTERACTIVE PROMPTING FOR SUPPLY CHAINS

(71) Applicant: Microsoft Technology Licensing, LLC, Redmond, WA (US)

(72) Inventors: Peeyush Kumar, Seattle, WA (US); Yunqing Li, Raleigh, NC (US); Maria Angels De Luis Balaguer, Redmond, WA (US); Ranveer Chandra, Kirkland, WA (US); Leonardo de Oliveira Nunes, Rio de Janeiro (BR); Sara Malvar Maua, Sao Paulo (BR)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 18/666,689

(22) Filed: May 16, 2024

(65) Prior Publication Data

US 2025/0191082 A1     Jun. 12, 2025

Related U.S. Application Data

(60) Provisional application No. 63/608,137, filed on Dec. 8, 2023.

(51) Int. Cl.
G06Q 50/02 (2024.01)
G06F 40/35 (2020.01)
(Continued)

(52) U.S. Cl.
CPC ............. G06Q 50/02 (2013.01); G06F 40/35 (2020.01); G06N 5/022 (2013.01); G06Q 30/0201 (2013.01)

(58) Field of Classification Search
None
See application file for complete search history.

(56) References Cited

U.S. PATENT DOCUMENTS

| | | | |
|---|---|---|---|
| 2022/0230625 A1* | 7/2022 | Zhu | G10L 15/063 |
| 2024/0078561 A1* | 3/2024 | Cogan | G06Q 30/018 |
| 2024/0160955 A1* | 5/2024 | Zhao | G06N 5/01 |

OTHER PUBLICATIONS

Bruno, Alessandro, et al. "Insights into Classifying and Mitigating LLMs' Hallucinations." arXiv preprint arXiv:2311.08117 (2023) (Year: 2023).*

(Continued)

*Primary Examiner* — George Chen
(74) *Attorney, Agent, or Firm* — Alleman Hall LLP

(57) ABSTRACT

A computing system for interactive prompting for a supply chain includes processing circuitry that constructs a knowledge graph based ontologies from a plurality of data sources, the ontologies being related to a product. In a turn-based dialog session, the processing circuitry receives a prompt for the product, identifies at least one ontology-level node in a first layer of the knowledge graph, and generates one or more sub-questions. The processing circuitry outputs the sub-questions via a large language model, receives responses to the sub-questions, identifies one or more second-level nodes in a second, middle layer of the knowledge graph based on the responses, and performs a multi-hop query to identify one or more instance-level nodes in the third layer of the knowledge graph. The processing circuitry outputs, via the large language model, text data corresponding to the instance-level nodes as an answer to the prompt.

20 Claims, 11 Drawing Sheets

(51) Int. Cl.
    *G06N 5/022*        (2023.01)
    *G06Q 30/0201*    (2023.01)

(56)              References Cited

OTHER PUBLICATIONS

Martino, et al., "Knowledge Injection to Counter Large Language Model (LLM) Hallucination", The Semantic Web: Eswc Satellite Events, 2023, pp. 182-185.
Wang, et al., "Multi-level Recommendation Reasoning over Knowledge Graphs with Reinforcement Learning", Proceedings of the ACM Web Conference, Apr. 25, 2022, pp. 2098-2108.

* cited by examiner

INTERACTIVE PROMPTING FOR SUPPLY CHAINS

CROSS REFERENCE TO RELATED APPLICATIONS

This application claims priority to U.S. Provisional Patent Application No. 63/608,137, filed Dec. 8, 2023, the entirety of which is hereby incorporated herein by reference for all purposes.

BACKGROUND

Generative artificial intelligence models, such as large language models, have been developed in recent years that can receive as input textual prompts from a user and generate in response textual responses. One type of generative model, the pre-trained transformer, is typically trained on a large corpus of natural language text. Although generative models can generate human-like responses, their ability to provide strategic responses for decision support in a particular knowledge domain can be limited. Examples of such domains include agricultural food products and industrial products.

The success of a business involves many factors, such as product pricing, consumer demand, product certification, product quality, available marketplaces, product packaging, and the annual cost for operating the business. Supply chains often experience fluctuating market demands, global economic shifts, and ongoing environmental concerns, thereby creating a challenge for the business to know how and where to effectively market their product. For example, when there are supply and demand inequalities in farms, orchards, and fields, an agricultural food product business may incur substantial waste and inflated costs.

Technology platforms to support such businesses are lacking. Existing information technology systems for product sales and potential marketplaces are largely limited to database retrieval systems. While emerging technologies such as generative artificial intelligence show promise in areas such as pre-trained transformer models, no such model has yet been adapted to provide effective decision support in with regard to agricultural food product and industrial product supply chains.

SUMMARY

To address the issues discussed herein, computing systems and methods for interactive prompting for agricultural food supply chains are provided. In one aspect, a computing system for interactive prompting for an agricultural food supply chain includes processing circuitry that executes instructions using portions of associated memory to implement an interactive prompting program. The processing circuitry obtains domain constructed ontologies related to an agricultural food product from a plurality of data sources and constructs a knowledge graph based on the ontologies. In an inference phase, the processing circuitry receives a prompt for the agricultural food product via a prompt interface in a turn-based dialog session, identifies at least one ontology-level node in a first layer of the knowledge graph, and generates one or more sub-question prompts to identify factors relating to at least one of economic structure, location of a growing facility, certification of the growing facility, and type of the agricultural food product. The one or more sub-questions prompts is input to a large language model, and, in response, and one or more sub-questions are received as output from the large language model. The one or more sub-questions are output for display in the turn-based dialog session via the prompt interface. The processing circuitry receives responses to the one or more sub-questions via a prompt interface in a turn-based dialog session, and identifies one or more second-level nodes in a second, middle layer of the knowledge graph based on the responses to the one or more sub-questions. A multi-hop query is performed to identify one or more instance-level nodes in a third layer of the knowledge graph, and text data corresponding to the one or more instance-level nodes is output by the large language model as an answer to the prompt about the agricultural food product via a prompt interface in a turn-based dialog session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Using generative models such as large language models (LLMs) in agricultural food product and industrial product supply chains can help businesses and farmers determine where to and how to market their products. However, such models are subject to the problem of hallucination, i.e., the models may generate information that might not be accurate or relevant. For example, a naïve query to a conventional large language model by a farmer seeking to sell a crop of apples, for example, might generate hallucinations containing erroneous information on markets that do not accept apples or that are not accessible to the farmer, for example. Such errors at best waste the time of the farmer, and at worst might cause the farmer to take a misinformed action.

Another weakness of generative models such as large language models is that they, used alone, cannot be relied upon to apply a consistent decision making support strategy to queries from such farmers relating to the agricultural food supply chain, thus a farmer's experience using such models may be inconsistent.

In view of the issues discussed above, a computing system for generating knowledge graphs for large language model prompting in a supply chain is disclosed herein. The computing system addresses the issues discussed above by implementing knowledge graphs in conjunction with domain-specific datasets, which are accessed via a large language model. Knowledge graphs (KGs) include structured mappings of entities and concepts, thereby providing a framework that ensures accuracy and relevance. Additionally, the interpretability and evolving nature of KGs allow for a more tailored, responsive, and adaptive strategy in decision-making.

In the context of agricultural food supply chains and the subject disclosure, the transparency of relationships between entities in a KG allows farmers to make informed decisions based on verifiable facts and well-established domain-specific knowledge. The integration of KGs with LLMs enables a user to "converse" with the large language model to determine where to market their agricultural food product, with the accuracy of the output of the large language model being increased by the knowledge graph.

Figure 1:
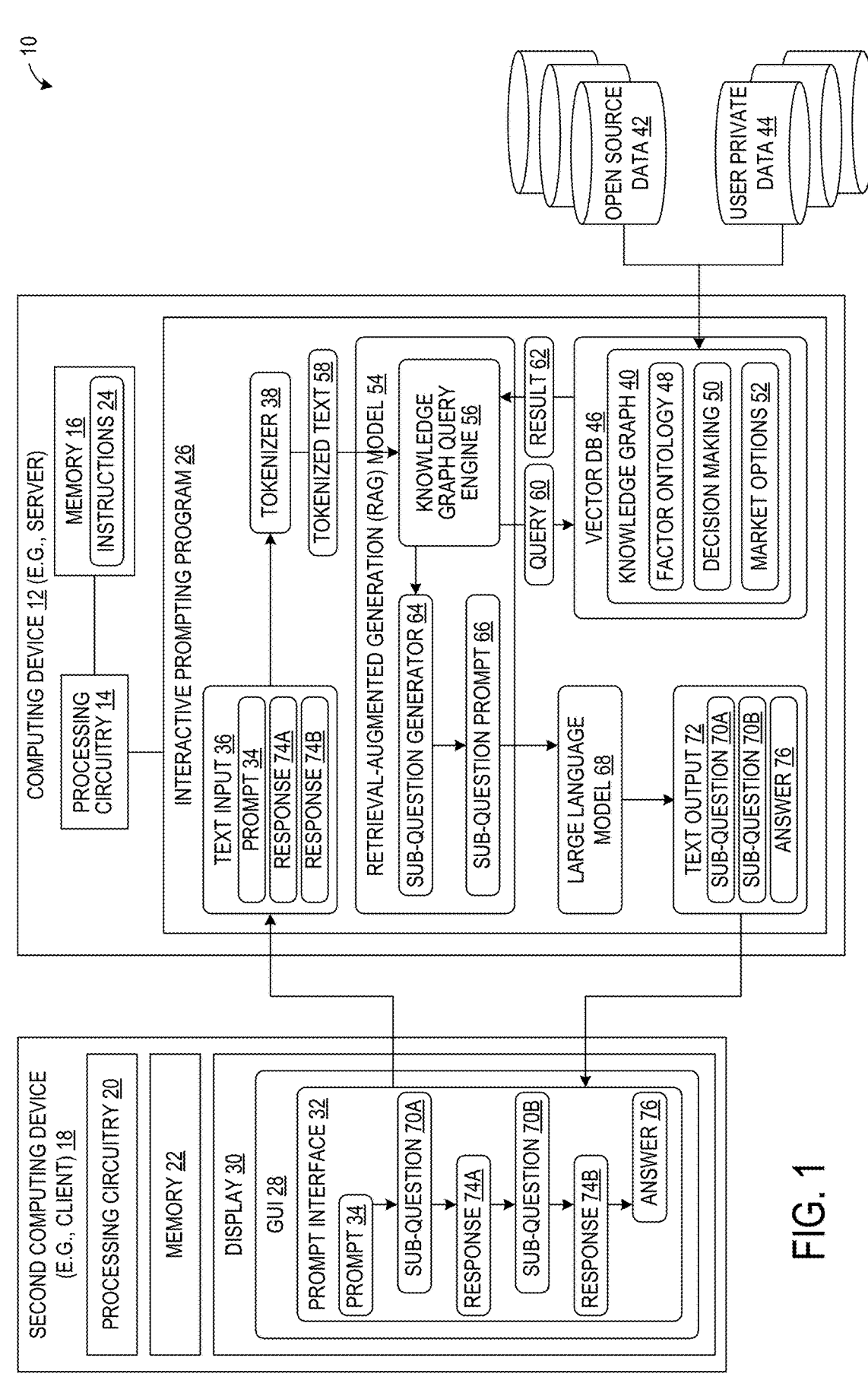
FIG. 1 is a schematic diagram of a computing system for interactive prompting for a supply chain.

Referring initially to FIG. 1, the computing system 10 includes at least one computing device. The computing system 10 is illustrated as having a first computing device 14 including processing circuitry 18 and memory 22, and a second computing device 16 including processing circuitry 20 and memory 24, the second computing device 16 being in communication with the first computing device 14 via a network. The illustrated implementation is exemplary in nature, and other configurations are possible. In the description below, the first computing device will be described as a server 14 and the second computing device will be described as a client computing device 16, and respective functions carried out at each device will be described. It will be appreciated that in other configurations, the computing system 10 may include a single computing device that carries out the salient functions of both the server 14 and client computing device 16, and that the first computing device could be a computing device other than server. In other alternative configurations, functions described as being carried out at the server 14 may alternatively be carried out at the client computing device 16 and vice versa.

Continuing with FIG. 1, the processing circuitry 18 is configured to execute instructions using portions of associated memory 22 to implement an interactive prompting program 26. At a high level, the interactive prompting program 26 leverages a knowledge graph to generate sub-questions in response to a user prompt to improve the accuracy of information output from a large language model.

The client computing device 16 includes a user interface 28 that is displayed on a display 30. A prompt interface 32 within the user interface 28 is configured to receive a prompt 34 input from a user, which may be a question or an instruction relating to a product. The prompt 34 is received by the interactive prompting program 26 as text input 36, and tokenized by a tokenizer 38.

As discussed above, the accuracy of the answer to the prompt 34 is guided and enhanced by utilizing data from a knowledge graph (KG) 40. As described in detail below with reference to FIGS. 3 and 4, the KG 40 is constructed via one or more large language models using open source data 42 and user private data 44 to obtain domain constructed ontologies related to the product. Text data is generated from the open source data 42 and user private data 44, and embeddings are generated from the text data. The KG 40 is stored in a vector database 46, and information related to the prompt 34 is retrieved from the embeddings via a retrieval model, such as a retrieval-augmented generation (RAG), as described below. In the example described herein, the KG 40 includes sub-graphs with data related to factor ontology 48, decision making 50, and market options 52. However, it will be appreciated that the knowledge graph 40 may include other types of sub-graphs.

To retrieve information relevant to the prompt 34, the interactive prompting program 26 implements a RAG model 54. A knowledge graph query engine 56 included in the RAG model 54 is configured to receive tokenized text 58 that represents the user-input prompt 34. The knowledge graph query engine 56 sends a query 60 for a semantic search to the vector database 46 to identify at least one ontology-level node in a first layer of the KG 40 that matches information in the prompt 34. A result 62, including contextual data related to the query 34, is returned to the knowledge graph query engine 56, which in turn transmits the result 62 to a sub-question generator 64. The sub-question generator 64 processes the contextual data to determine keywords, and the keywords are used to generate one or more sub-question prompts 66 to identify factors relating to at least one of economic structure, location of a growing or production facility, certification of the facility, and type of the product. A large language model 68 then outputs one or more sub-questions 70 according to the one or more sub-question prompts 66. In the example described herein, there are two sub-questions 70A, 70B; however, it will be appreciated that fewer or more sub-questions may be generated.

The sub-questions 70A, 70B are sent as text output 72 to the client computing device 18, where they are displayed in the prompt interface 32. As described in detail below with reference to FIG. 7A, responses 74A, 74B to the respective sub-questions 70A, 70B are entered in the prompt interface 32.

Similar to the processing of the initial prompt 34 described above, the responses to the one or more sub-questions 74A, 74B are received by the interactive prompting program 26 as text input 36 and tokenized by the tokenizer 38. The knowledge graph query engine 56 queries the vector database 46 to identify one or more second-level nodes in a second, middle layer of the KG 40, based on the responses 74A, 74B to the sub-questions 70A, 70B. As described below with reference to FIGS. 7B and 7C, a multi-hop query is performed within the KG 40 to identify one or more instance-level nodes in the third layer of the KG 40. Embeddings representing the instance-level nodes are returned to the RAG model 54, processed, and included in prompts sent to the large language model 68, such that the text output 72 of the LLM 68 considers the one or more instance-level nodes. The RAG model 54 queries the knowledge graph on each iteration through the retrieval-augmented generation process from prompt 34 to answer 76. Because of this, answer 76 can be referred to as a knowledge graph-enhanced large language model (KG-enhanced LLM) answer 76 to the prompt 34 for the product.

It will be appreciated that the LLM 68 can have tens of millions to billions of parameters, non-limiting examples of which include GPT-3, BLOOM, and LLaMa-2. Further, the LLM can be configured as a multi-modal generative model configured to receive multi-modal input including natural language text input as a first mode of input and image, video, or audio as a second mode of input, and generate output including natural language text based on the multi-modal input. The output of the multi-modal model may additionally include a second mode of output such as image, video, or audio output. Non-limiting examples of multi-modal generative models include Kosmos-2 and GPT-4 VISUAL. Further, the trained generative language model can be configured to have a generative pre-trained transformer architecture, examples of which are used in the GPT-3 and GPT-4 models. Although the LLM 68 is depicted as being implemented on computing device 12, it will be appreciated that distributed processing architectures are envisioned in which the processing circuity and logic depicted as implemented on computing device 12 are implemented across multiple connected devices. In such implementations, the LLM 68 can be implemented on a different server than the remaining components, for example.

The examples described herein with respect to FIGS. 2-8 relate to agricultural food product supply chains, particularly an apple supply chain. However, it will be appreciated that the system could also be implemented in other types of supply chains, such as industrial product supply chains.

Figure 2:
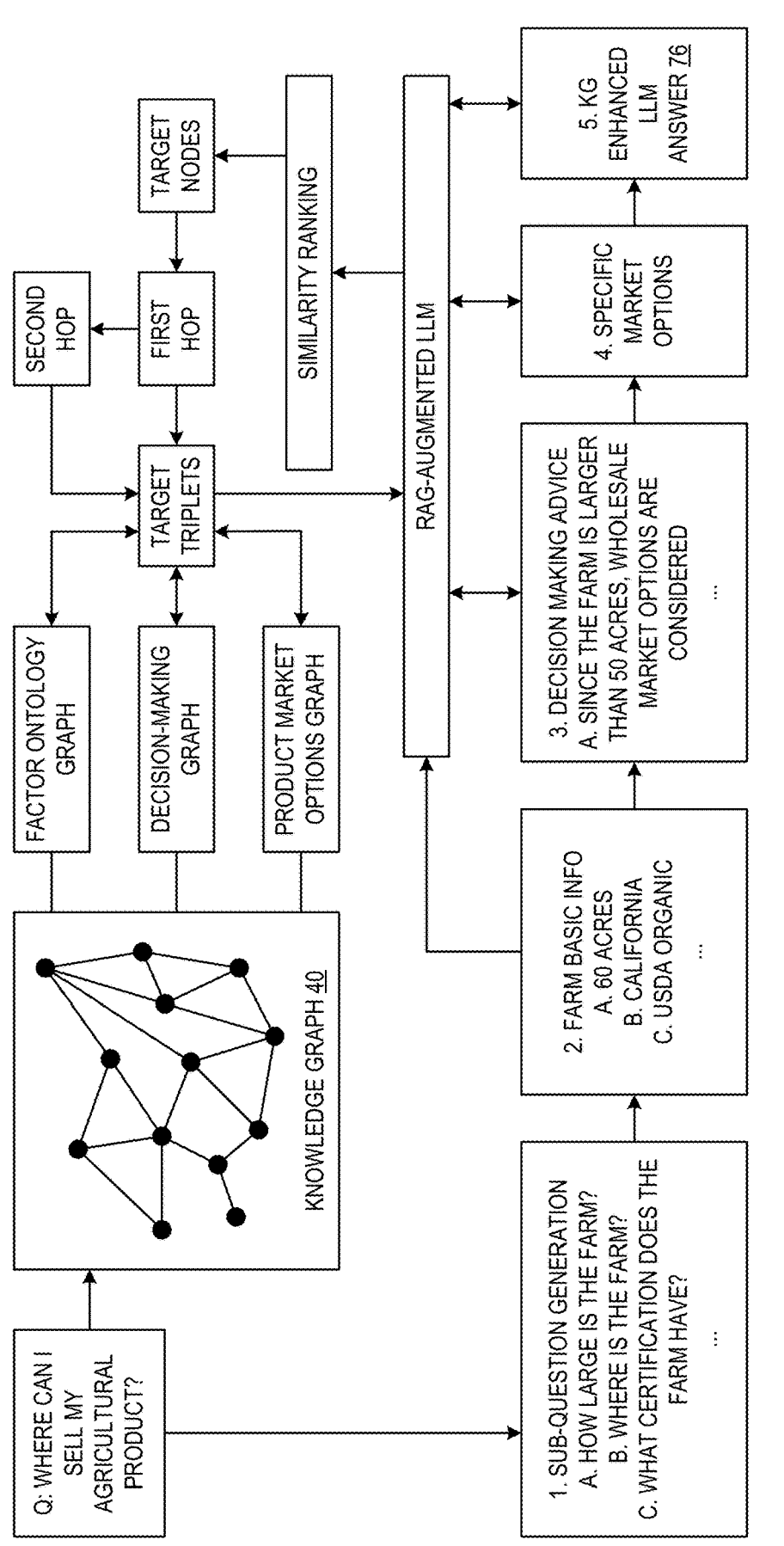
FIG. 2 is a schematic diagram showing the flow of information from a prompt to a knowledge graph-enhanced large language model answer, in accordance with the computing system of FIG. 1.

FIG. 2 is a schematic diagram showing the flow of information from the user-input prompt 34 to the KG-enhanced LLM 76 answer in an agricultural food supply chain. As discussed above with respect to FIG. 1, a user may enter the prompt 34 via the prompt interface 32. Sub-questions (step 1) are generated to determine farm basic information (step 2) that is needed in decision making (step 3). Information in the multi-level KG 40 is accessible by the LLM 68 via the RAG model 54 to determine specific market options (step 4), and the KG-enhanced LLM answer 76 is then output to the client computing device 18 (step 5).

The functionality of the interactive prompting program 26 requires metadata, which can be classified into three primary categories: pipeline-related metadata, file-related metadata, and GPT-generated metadata. Pipeline-related metadata includes information pertaining to machine learning components, such as a component name or version, to identify specific elements and their respective versions utilized within the pipeline, which is used for version control, debugging, and system updates. Pipeline-related metadata may also include input arguments that provide instructions or parameters to guide the functioning of the components, thereby enabling tailored operations based on available data. File-related metadata is data extracted from a PDF parser, and includes the title of the document, date of document creation and/or modification, authors, directory, images, and user-defined metadata. GPT-generated metadata includes a topic or category as a broad classification of the content in the document.

As described above with respect to FIG. 1, the LLM 68 is configured to retrieve information from a collection of datasets via retrieval-augmented generation (RAG). However, some data preprocessing is required before the application of RAG. In the embodiments described herein, the collection of data is primarily composed of spreadsheets from open source data 42 and user private data 44; thus, the preprocessing is tailored to this format. The preprocessing and RAG are implemented by generating text data from spreadsheets, generating embeddings from the text data, and retrieving information from the embeddings.

To generate the text data, each spreadsheet is converted to a text file format using a custom script in which the values are converted into a CSV-like format spreadsheet and the formulas are captured at the end of the file. For example, GROBID (GeneRation of Bibliographic Data), an open-source machine learning library, may be implemented for extracting, parsing, and analyzing bibliographic information from raw documents, such as academic papers, journal articles, and technical reports. GROBID uses a combination of techniques such as Conditional Random Fields (CRF), long short-term memory (LSTM) neural networks, and other probabilistic models to recognize and structure various components of the raw documents, including metadata, citation details, and references, and transform unstructured data into structured XML or TEI (text encoding initiative) formats. A GROBID parser may be implemented to process and convert data from the TEI-XML format into structured data formats such as JSON, JSONL, and Markdown by parsing the XML, extracting metadata, handling content chunking, and transforming tables into CSV format.

In addition, a small summary of the spreadsheet, such as a summary generated by an LLM, is added at the beginning of the text file to quickly identify information in the file during the retrieval step. Sequence transformers are used to generate embeddings of text chunks extracted from the text documents. When needed, a translation component interacts with a translation service API to translate text segments from various languages to English. A similarity search, e.g., a library for efficient indexing and similarity search of vectors, is used to create the vector database. Relevant information to answer the user prompt and process with responses to the sub-questions is retrieved from the vector database using the retrieval model that returns the top pieces of the text files related to the query, thereby forming the context text that is provided to the LLM to answer the initial prompt.

Figure 3:
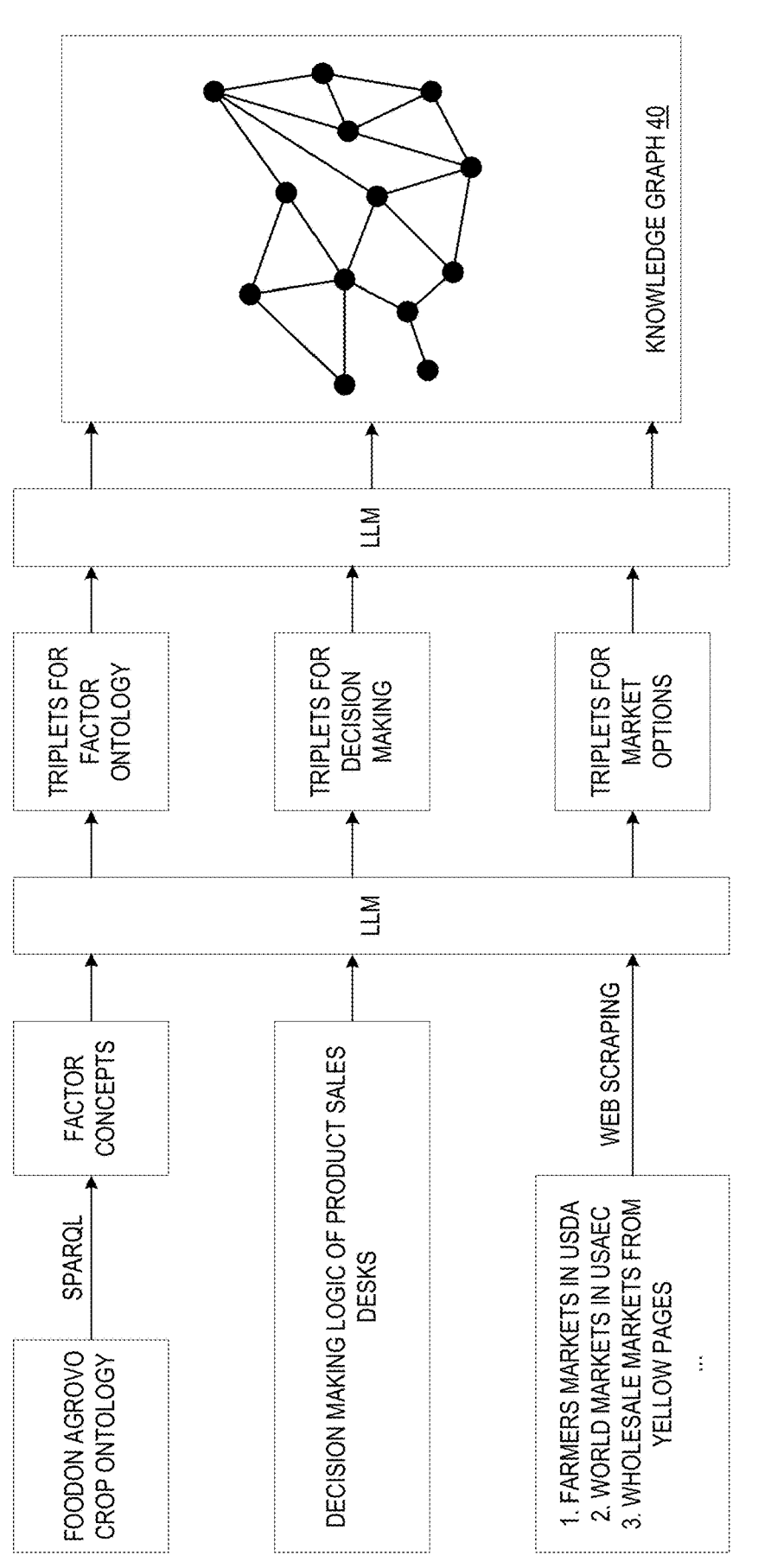
FIG. 3 is a schematic diagram of knowledge graph construction, in accordance with the computing system of FIG. 1.
Figure 4:
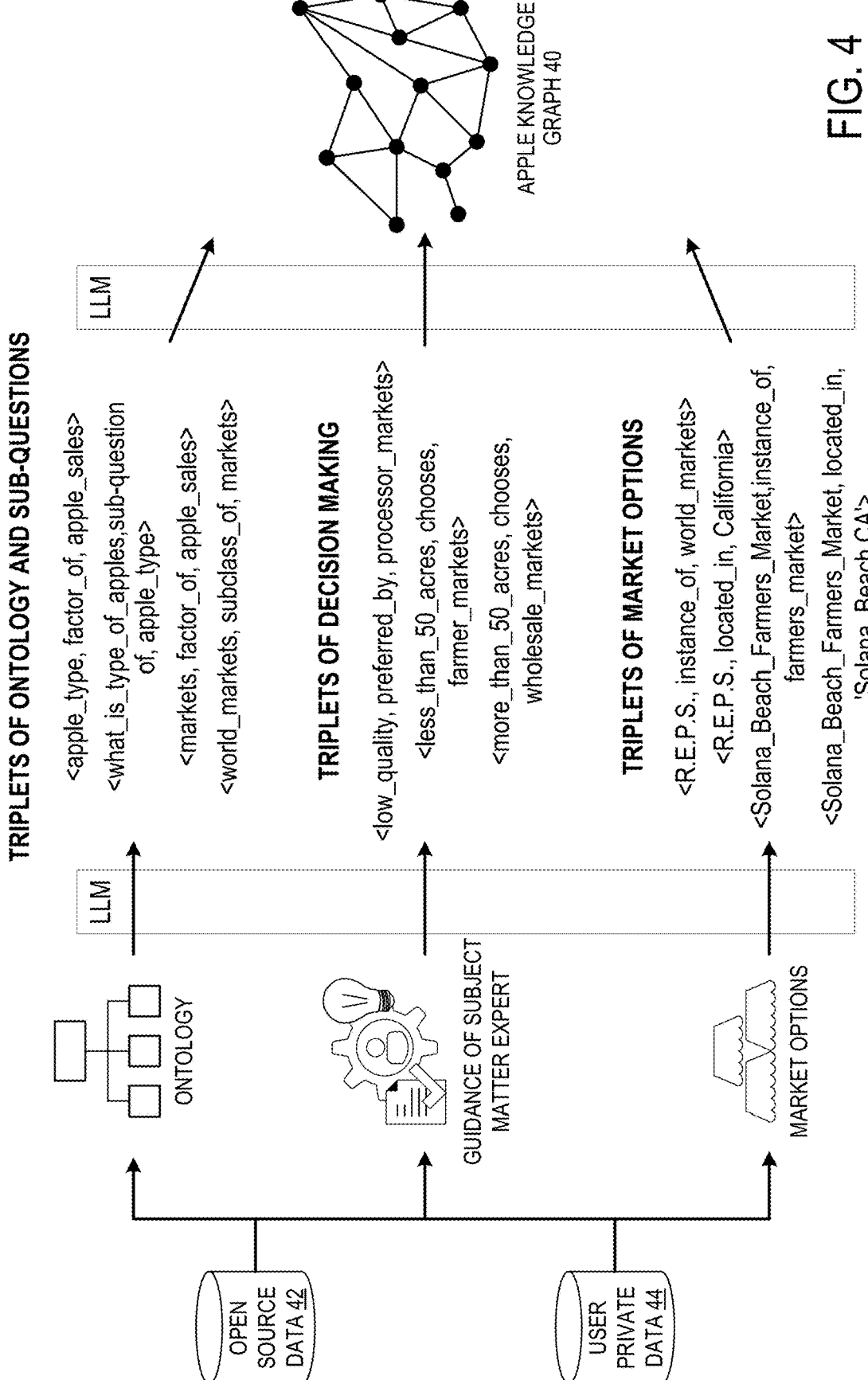
FIG. 4 is an illustration of a specific example of knowledge graph construction, in accordance with the computing system of FIG. 1.

FIG. 3 is a schematic diagram of knowledge graph construction, and FIG. 4 is an illustration of an implementation of knowledge graph construction using apples as an example agricultural food product. The overall process of constructing a KG includes extracting/scraping textual data from both open source data and user private data, transforming text data into triplets via an LLM, and, after edge and entity alignment, indexing decision-making information in a graph. Ontology information, such as a product type or available market forms the backbone of the KG, as data from existing ontologies can be used to build triplets of factors and sub-questions for interacting with user. Market data from public and private sources is collected and transformed to entities in the graph, which can be connected with entities from the ontology using "instance of," as described below with reference to FIG. 5. Guidance from agricultural food product experts is transformed, aligned, and connected with the entities of ontology using triplets to help in the decision-making process.

Figure 5:
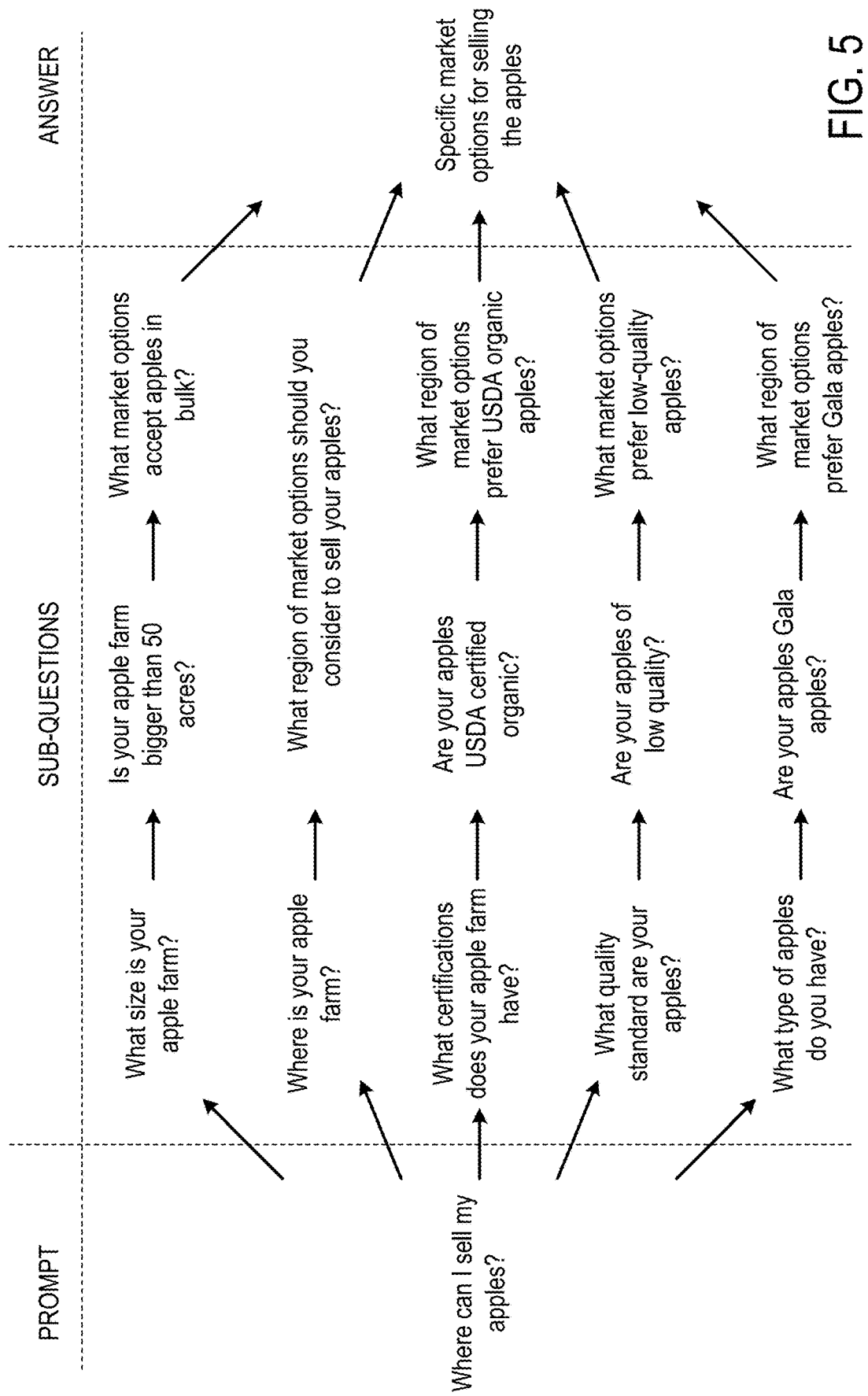
FIG. 5 is a flow chart of reduction of a prompt into sub-questions, in accordance with the computing system of FIG. 1.

FIG. 5 is a flow chart of reduction of a prompt into sub-questions. To effectively address the initial prompt input by the user, it is necessary to identify various factors that affect the answer, as discussed above with reference to step 1 in FIG. 2. Such factors may include, but are not limited to, the economic structure, location, and certification of the growing facility, as well as the quality and type of the agricultural food product. As described above with respect to FIG. 1, these factors are identified through one or more sub-questions to determine specific market options that are available, as illustrated in FIG. 4 which shows an example of sub-questions with apples as the agricultural food product.

Figure 6:
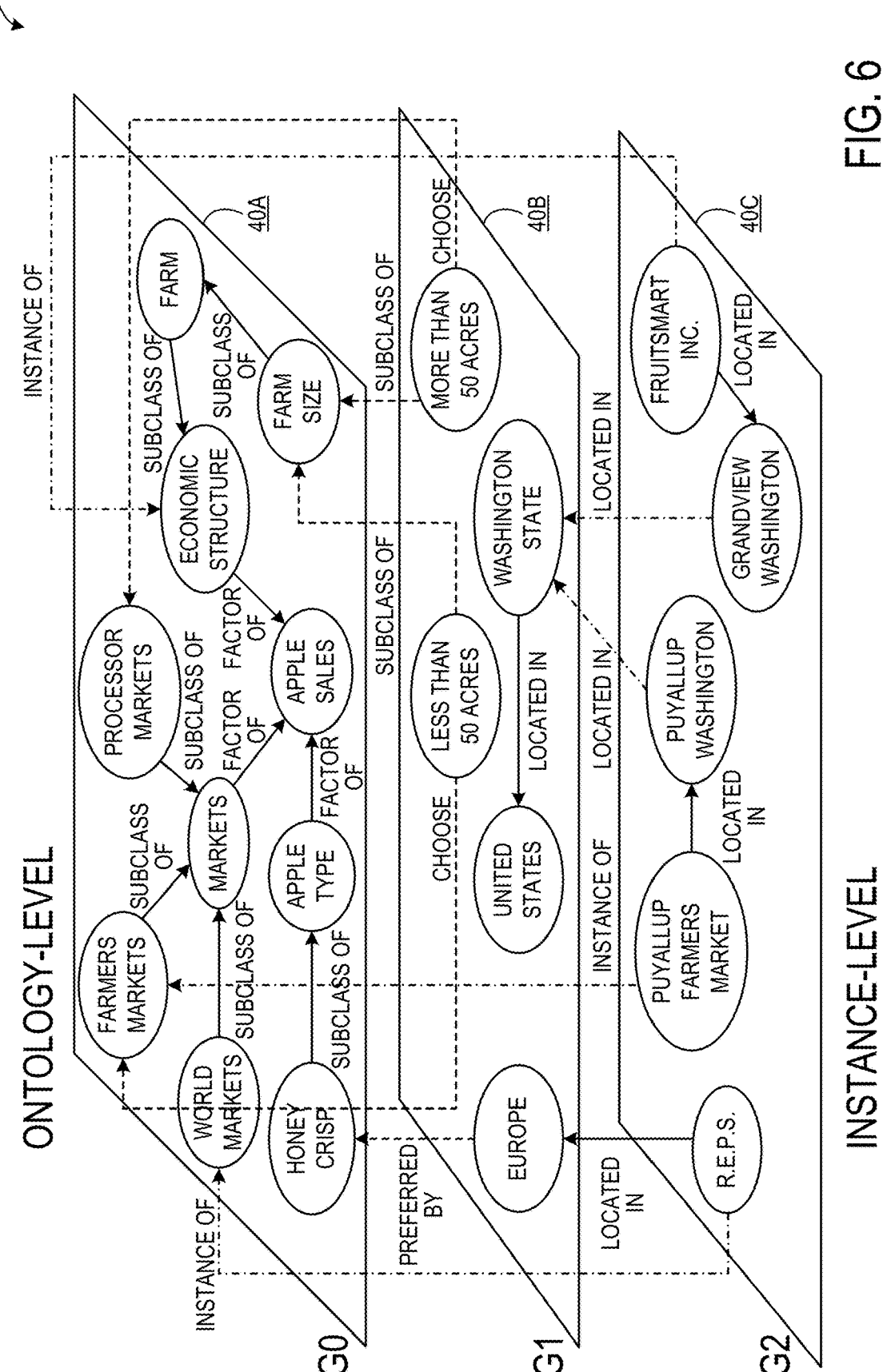
FIG. 6 is an example of multi-level reasoning over a knowledge graph, in accordance with the computing system of FIG. 1.

FIG. 6 is an example of multi-level reasoning over a knowledge graph. Multi-level reasoning refers to the process of making inferences or decisions by considering information from different levels of abstraction or granularity.

Multi-level reasoning over KGs refers to the process of drawing inferences and making decisions based on information stored within a KG, considering multiple layers or hierarchies of information. In the example shown, multi-level reasoning integrates data regarding apples sales from three layers of knowledge graph. A first layer, G0, is configured as an ontology-level layer 40A (i.e., sub-graph) that contains ontology-level nodes that represent factorial entities related to apple sales. A second, middle layer, G1, contains second-level nodes that represent logic from agricultural regulations and subject matter experts for decision making. A third layer, G2, is configured as an instance-level layer that contains instance-level nodes that represent specific diversified market options and their respective locations.

Figure 7A:
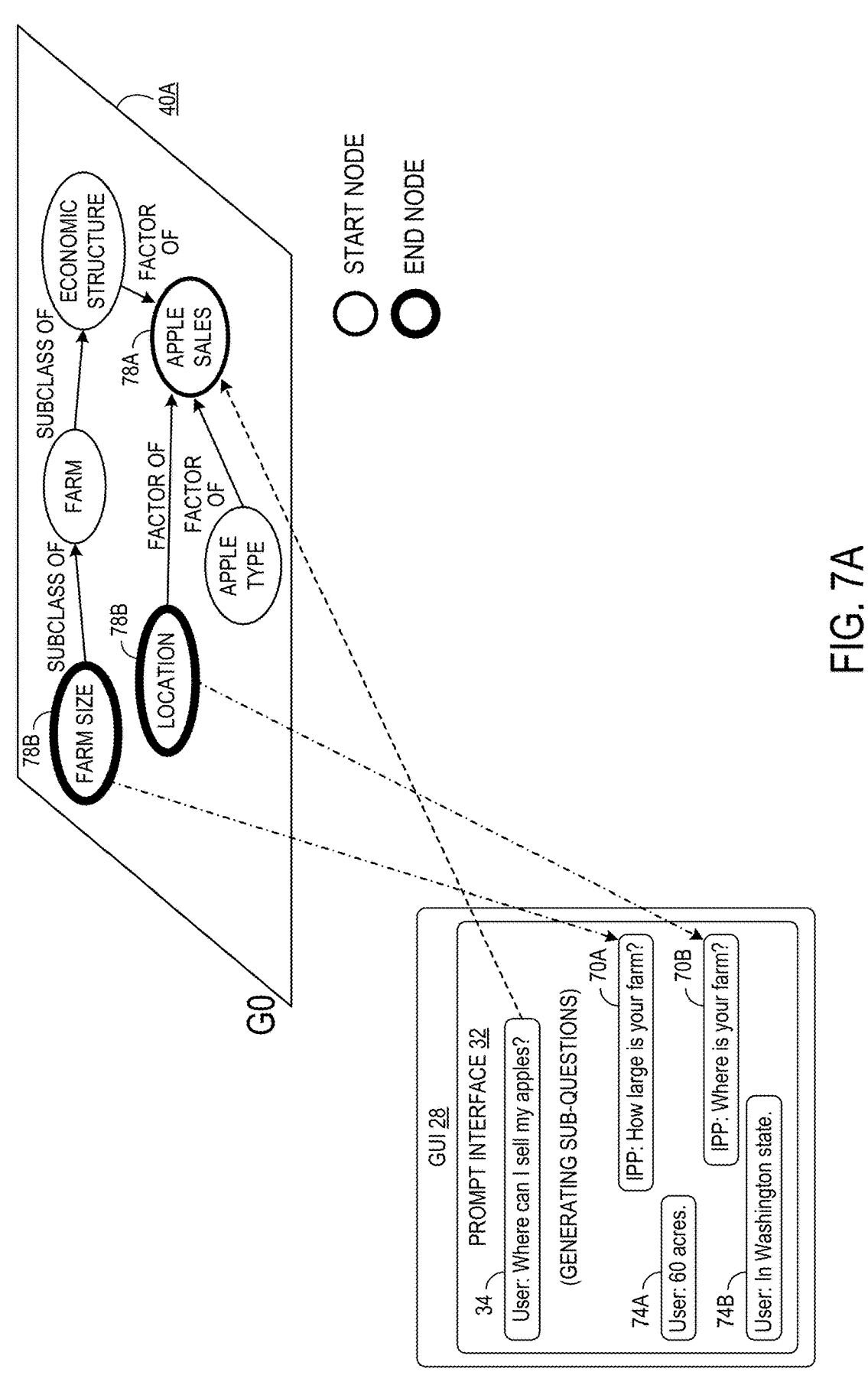
FIGS. 7A-7C show different levels of multi-level reasoning over a knowledge graph, in accordance with the computing system of FIG. 1.
Figure 7B:
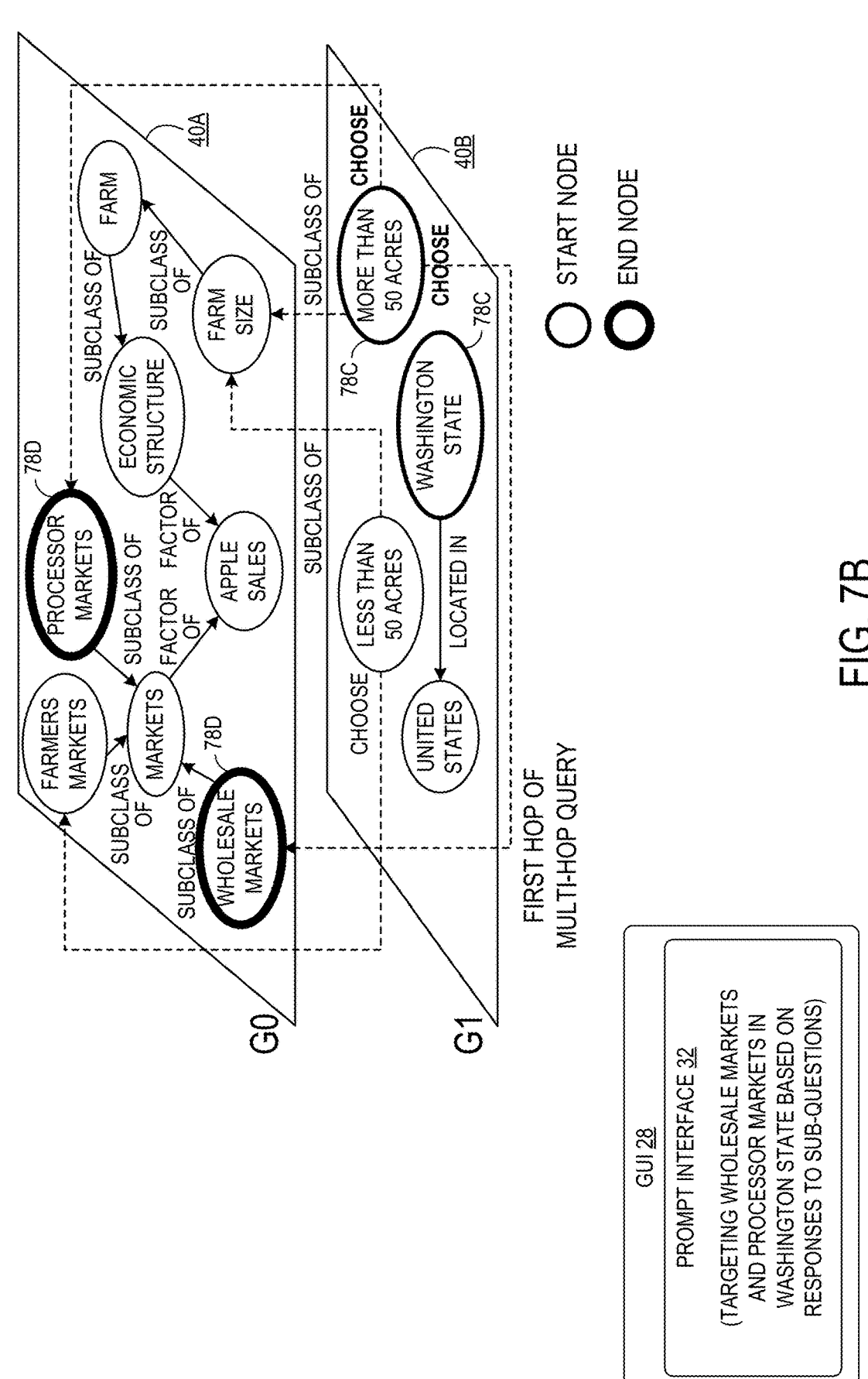
Figure 7C:
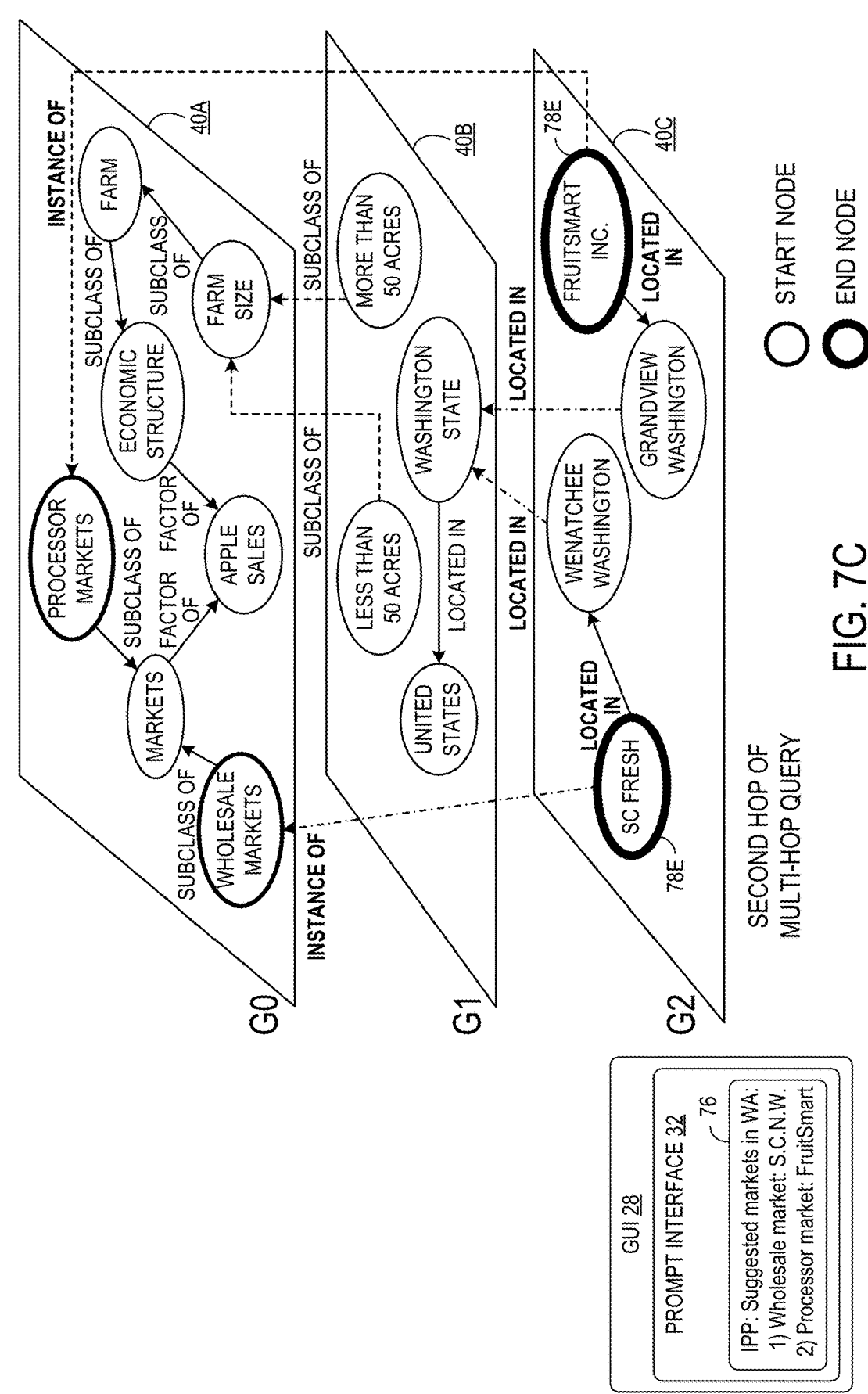

FIGS. 7A-7C show different levels of multi-level reasoning over a knowledge graph with regard to the sub-questions shown in FIG. 5 and the KG layers shown in FIG. 6. When the prompt 34 is entered, the interactive prompting program 26 identifies at least one ontology-level node in a first layer 40A, i.e., ontology-level layer, of the knowledge graph 40 that matches the information in the prompt. The user's responses to the one or more sub-questions is then used to identify one or more second-level nodes in a second, middle layer 40B of the knowledge graph 40. By using multi-hop query, as shown in FIG. 2, the system subsequently identifies instance-level nodes in the third layer 40C, i.e., instance-level layer, of the knowledge graph 40.

In the example illustrated in FIG. 7A, the prompt 34 "where can I sell my apples?" includes the information "sell" and "apples," which maps to a start node 78A representing "apple sales." Based on the edges from the start node that define the relationships to the ontology of apple sales, two ontology-level end nodes 78B "farm size" and "location" are identified as matching the information in the prompt. Basic information regarding the user's apple farm is then collected by reducing the user's original prompt to multiple sub-questions to determine a size and location of the user's apple farm.

As shown in FIG. 7A, the apple farm is indicated to be 60 acres in size and located in Washington state. This information matches second-level start nodes 78C "more than 50 acres" and "Washington state." In a first hop from the node representing the size parameters of the farm, two second-level end nodes 78D "processor markets" and "wholesale markets" are identified with regard to market options where the apples can be sold, as illustrated in FIG. 7B.

A second hop identifies end nodes 78E "SC Fresh" and "FruitSmart, Inc." in the instance-layer 40C of the knowledge graph 40 that represent individual instances of wholesale markets and processor markets located in Washington state, thereby prioritizing these market options for the user. The identified specific instances of market options are collected and output to the user as the answer 76 to the initial prompt 34.

To determine the accuracy of the answer output with regard to the question "where can I sell my apples?," ten instances of the prompt were entered to the LLM-KG interactive prompting program described herein and to an open-source LLM, each instance using different basic information, i.e., different responses to the sub-questions. Each of the KG-enhanced LLM answers was scored and compared to responses from the open-source LLM. The open-source LLM scored the responses from itself and from the LLM-KG interactive prompting program on overall quality based on the 5-point scale shown in Table 1. As shown in Table 2, the KG-enhanced LLM answers achieved a higher average quality score for generated answers as compared to answers from the open-source LLM.

TABLE 1

Scoring Criteria for Quality of Output Answers

| Score | Quality | Criteria |
|---|---|---|
| 1 | Very Poor | The response does not address the farmer's need at all regarding apple sales. The information provided is entirely irrelevant or blatantly inaccurate. |
| 2 | Poor | The response loosely touches on the topic of apple sales. However, it might be filled with generalities and clichés, offering only basic suggestions that could apply to any farm. The advice does not seem to have taken the specifics of the farmer's situation into account. |
| 3 | Fair | The response recognizes the farmer's urgent need for apple sales, but it lacks depth. It provides a mix of relevant and general advice but may fail to mention specific market options or tail recommendations according to the farmer's unique situation. |
| 4 | Good | The response provides pertinent information about apple sales and aligns with the farmer's immediate needs. It offers valuable insights and some specific market options, but it might be lengthy or does not rank/prioritize options. |
| 5 | Excellent | The response is on point and expertly tailored to the farmer's situation. It suggests specific, actionable market options for apple sales, covering both local and international opportunities. Recommendations are presented in a clear, prioritized, and concise manner, making it easy for the farmer to act upon. |

TABLE 2

Scores of answers to "where can I sell my apples?"

| | Question | | | | | | | | | | |
|---|---|---|---|---|---|---|---|---|---|---|---|
| | 1 | 2 | 3 | 4 | 5 | 6 | 7 | 8 | 9 | 10 | Avg |
| LLM answer | 3 | 4 | 4 | 4 | 5 | 4 | 4.5 | 4 | 5 | 4 | 4.15 |
| KG-enhanced LLM answer | 5 | 5 | 5 | 5 | 3 | 5 | 4 | 3 | 4 | 5 | 4.4 |

It will be appreciated that system described herein can be implemented with other supply chains, such as an industrial product supply chain. In this implementation, the knowledge graph is constructed based on domain constructed ontologies related to an industrial product, and the prompt is a question regarding where the industrial product can be sold. The turn-based dialog session is similar to that described above with reference to agricultural food product supply chains, with the RAG model generating one or more sub-question prompts to identify factors relating to at least one of economic structure, location of a production facility, certification of the production facility, and type of the industrial product. The first layer of the knowledge graph is configured as an ontology-level layer that contains factorial entities related to sales of the industrial product, the second, middle layer of the knowledge graph includes logic from industrial regulations and subject matter experts for decision making, and the third layer of the knowledge graph is configured as an instance-level layer that contains specific diversified market options for the industrial product and their respective locations. Text data corresponding to the one or more instance-level nodes is output as an answer to the prompt for the industrial product in the turn-based dialog session via the prompt interface.

By integrating KGs with LLMs in the present approach, a powerful synergy is created that has the potential to drive efficiency, reduce waste, and foster a more resilient and harmonious supply chain.

Figure 8:
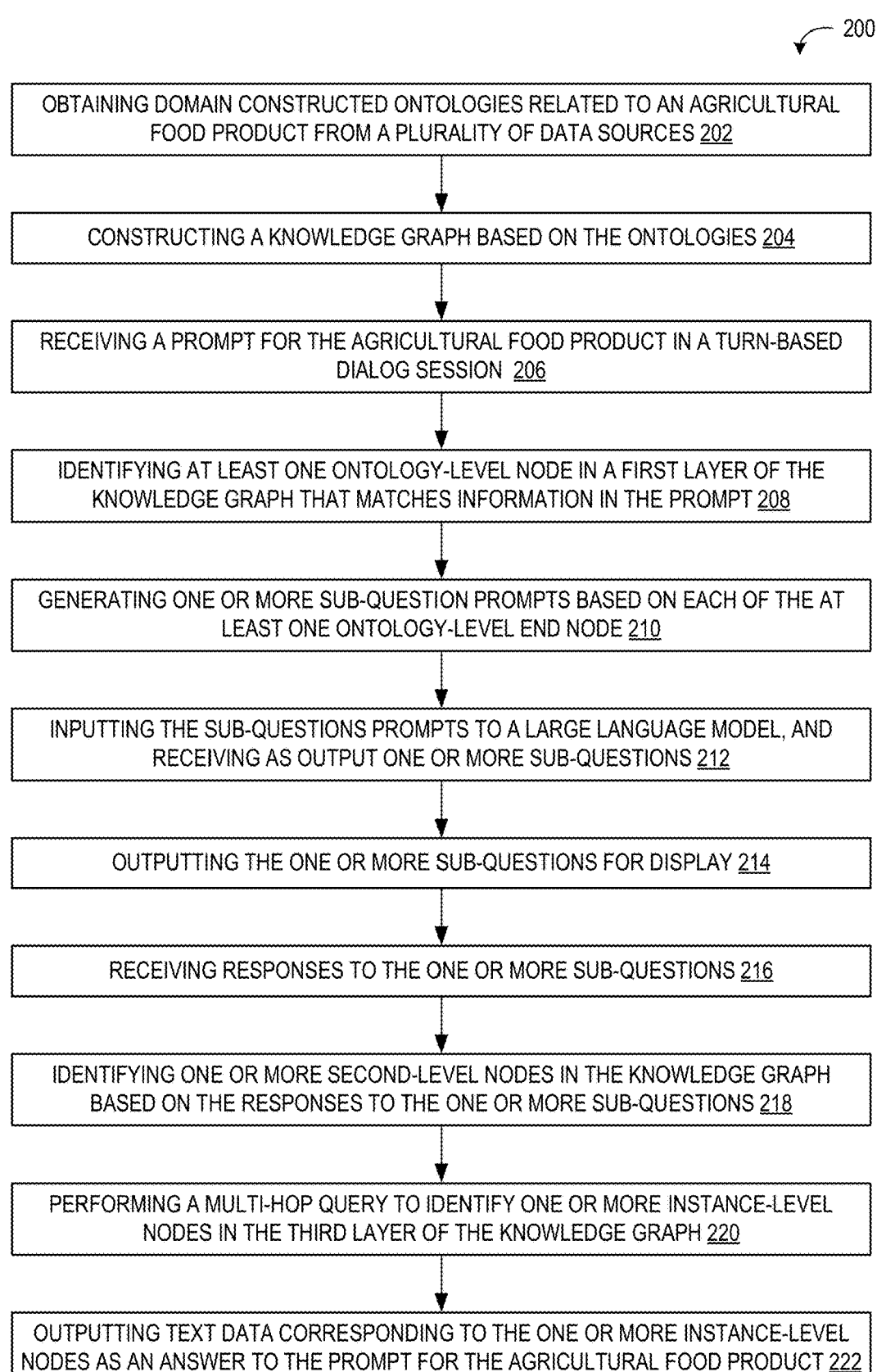
FIG. 8 shows a flowchart of a method according to an example implementation of the present disclosure.

FIG. 8 shows a flowchart for a method 200 for interactive prompting for an agricultural food supply chain. Method 200 may be implemented by the hardware and software of computing system 10 described above, or by other suitable hardware and software. At step 202, the method 200 may include obtaining domain constructed ontologies related to an agricultural food product from a plurality of data sources. As described above, the knowledge graph may be constructed using open source data and user private data.

Proceeding from step 202 to step 204, the method 200 may further include constructing a knowledge graph based on the ontologies. The knowledge graph may include subgraphs with data related to factor ontology, decision making, and market options. For example, the first layer of the knowledge graph may be configured as an ontology-level layer that contains factorial entities related to sales of the agricultural food product, the second, middle layer of the knowledge graph may include logic from agricultural regulations and subject matter experts for decision making, and the third layer of the knowledge graph may be configured as an instance-level layer that contains specific diversified market options for the agricultural food product and their respective locations.

Advancing from step 204 to step 206, the method 200 may further include, in an inference phase, receiving a prompt for the agricultural food product in a turn-based dialog session via a prompt interface. The prompt may be entered by a user in the prompt interface within a user interface, and may be a question or an instruction relating to the agricultural food product. The prompt may be received as text input, and tokenized by a tokenizer Continuing from step 206 to step 208, the method 200 may further include in response to the prompt, identifying at least one ontology-level node in a first layer of the knowledge graph that matches information in the prompt. A knowledge graph query engine included in a retrieval-augmented generation model may send a query for a semantic search to a vector database to identify at least one ontology-level node in a first layer of the knowledge graph that matches information in the prompt. A result including contextual data related to the query may be returned to the knowledge graph query engine, which may transmit the result to a sub-question generator.

Proceeding from step 208 to step 210, the method 200 may further include generating one or more sub-question prompts based on each of the at least one ontology-level end node. The sub-question generator may process the contextual data to determine keywords, which may be used to generate one or more sub-question prompts to identify factors relating to at least one of economic structure, location of a growing facility, certification of the growing facility, and type of the agricultural food product.

Advancing from step 210 to step 212, the method 200 may further include inputting the one or more sub-question prompts to a large language model, and receiving as output one or more sub-questions according to the one or more sub-question prompts.

Continuing from step 212 to step 214, the method 200 may further include outputting the one or more sub-questions for display in the turn-based dialog session via the prompt interface. The sub-questions may be sent as text output to the client computing device, where they are displayed in the prompt interface. Responses to the sub-questions may be entered in the prompt interface.

Proceeding from step 214 to step 216, the method 200 may further include receiving responses to the one or more sub-questions in the turn-based dialog session via the prompt interface. As with the initial prompt, the responses to the one or more sub-questions may be received by the interactive prompting program as text input and tokenized by the tokenizer.

Advancing from step 216 to step 218, the method 200 may further include identifying one or more second-level nodes in a second, middle layer of the knowledge graph based on the responses to the one or more sub-questions. The knowledge graph query engine may query the vector database to identify second-level nodes that match responses to the sub-questions.

Continuing from step 218 to step 220, the method 200 may further include performing a multi-hop query to identify one or more instance-level nodes in the third layer of the knowledge graph. Embeddings representing the instance-level nodes may be returned to the knowledge graph query engine, processed, and sent to the large language model.

Proceeding from step 220 to step 222, the method 200 may further include outputting text data corresponding to the one or more instance-level nodes as an answer to the prompt for the agricultural food product in the turn-based dialog session via the prompt interface. As discussed above, the method described herein enables the large language model to output a knowledge graph-enhanced answer to the client computing device.

In some embodiments, the methods and processes described herein may be tied to a computing system of one or more computing devices. In particular, such methods and processes may be implemented as a computer-application program or service, an application-programming interface (API), a library, and/or other computer-program products.

Figure 9:
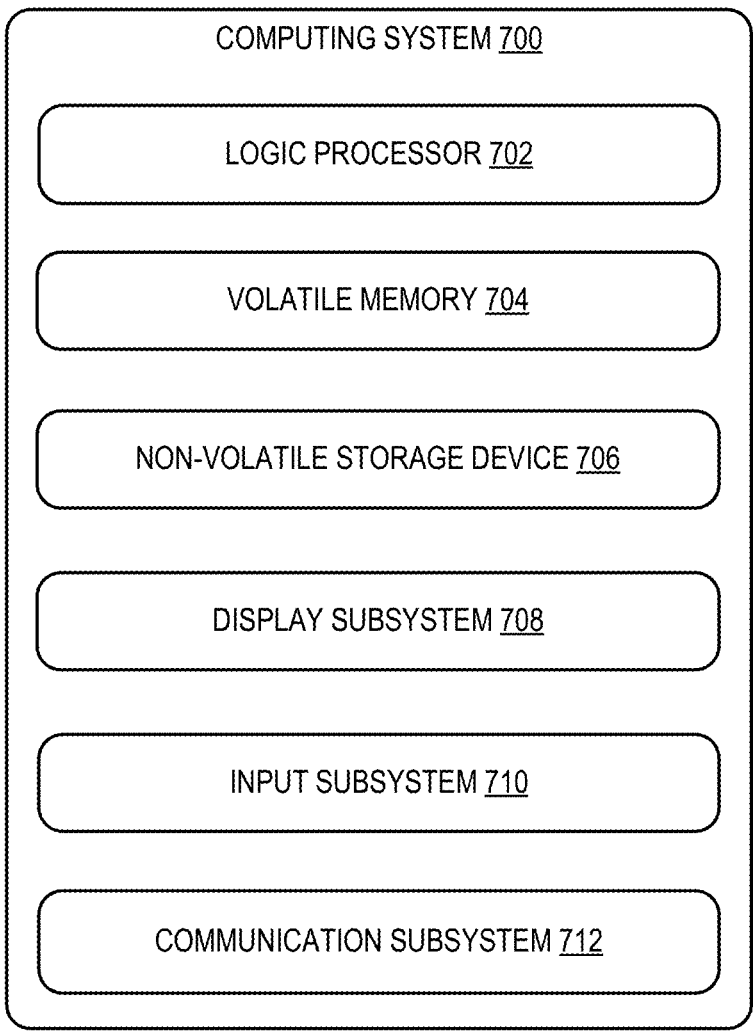
FIG. 9 is an example computing system according to one implementation of the present disclosure.

FIG. 9 schematically shows a non-limiting embodiment of a computing system 300 that can enact one or more of the methods and processes described above. Computing system 300 is shown in simplified form. Computing system 300 may embody the computing devices 14 and/or 16 described above and illustrated in FIG. 1. Components of computing system 300 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 300 includes processing circuitry 302, volatile memory 304, and a non-volatile storage device 306. Computing system 300 may optionally include a display subsystem 308, input subsystem 310, communication subsystem 312, and/or other components not shown in FIG. 9.

Processing circuitry 302 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 302 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 302.

Non-volatile storage device 306 includes one or more physical devices configured to hold instructions executable by the processing circuitry to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by processing circuitry 302 to temporarily store information during processing of software instructions. It will be appreciated that volatile memory 304 typically does not continue to store instructions when power is cut to the volatile memory 304.

Aspects of processing circuitry 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via processing circuitry 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with processing circuitry 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, camera, or microphone.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 300 to send and/or receive messages to and/or from other devices via a network such as the Internet.

The following paragraphs provide additional description of aspects of the present disclosure. One aspect provides a computing system for interactive prompting for an agricultural food product supply chain. The computing system may comprise a computing device including processing circuitry configured to execute instructions using portions of associated memory to implement an interactive prompting program. The processing circuitry may be configured to obtain domain constructed ontologies related to an agricultural food product from a plurality of data sources and construct a knowledge graph based on the ontologies. In an inference phase, the processing circuitry may receive a prompt for the agricultural food product via a prompt interface in a turn-based dialog session. In response to the prompt, the processing circuitry may identify at least one ontology-level node in a first layer of the knowledge graph that matches information in the prompt and generate one or more sub-question prompts to identify factors relating to at least one of economic structure, location of a growing facility, certification of the growing facility, and type of the agricultural food product. The processing circuitry may input the one or more sub-question prompts to a large language model, and, in response, receive as output from the large language model one or more sub-questions. The processing circuitry may output the one or more sub-questions for display in the turn-based dialog session via the prompt interface and receive responses to the one or more sub-questions in the turn-based dialog session via the prompt interface. The processing circuitry may identify one or more second-level nodes in a second, middle layer of the knowledge graph based on the responses to the one or more sub-questions, perform a multi-hop query to identify one or more instance-level nodes in a third layer of the knowledge graph, and output text data corresponding to the one or more instance-level nodes as an answer to the prompt for the agricultural food product in the turn-based dialog session via the prompt interface.

In this aspect, additionally or alternatively, the prompt may be a question regarding where the agricultural food product can be sold.

In this aspect, additionally or alternatively, the first layer of the knowledge graph may be configured as an ontology-level layer that contains factorial entities related to sales of the agricultural food product.

In this aspect, additionally or alternatively, the second, middle layer of the knowledge graph may include logic from agricultural regulations and subject matter experts for decision making.

In this aspect, additionally or alternatively, the third layer of the knowledge graph may be configured as an instance-level layer that contains specific diversified market options for the agricultural food product and their respective locations.

In this aspect, additionally or alternatively, the one or more sub-questions may identify factors relating to at least one of economic structure, location of a growing facility, certification of the growing facility, and type of the agricultural food product.

In this aspect, additionally or alternatively, the computing system may include a retrieval model configured to query the knowledge graph and generate the one or more sub-question prompts.

In this aspect, additionally or alternatively, the retrieval model may be a retrieval-augmented generation model.

In this aspect, additionally or alternatively, the knowledge graph may be constructed using open source data and user private data.

Another aspect provides a method for interactive prompting for an agricultural food supply chain. The method may comprise obtaining domain constructed ontologies related to an agricultural food product from a plurality of data sources and constructing a knowledge graph based on the ontologies. In an inference phase, the method may comprise receiving a prompt for the agricultural food product in a turn-based dialog session via a prompt interface. In response to the prompt, the method may comprise identifying at least one ontology-level node in a first layer of the knowledge graph that matches information in the prompt and generating one or more sub-question prompts based on each of the at least one ontology-level end node. The method may further comprise inputting the one or more sub-question prompts to a large language model and receiving as output one or more sub-questions according to the one or more sub-question prompts. The method may further comprise outputting the one or more sub-questions for display in the turn-based dialog session via the prompt interface and receiving responses to the one or more sub-questions in the turn-based dialog session via the prompt interface. The method may further include identifying one or more second-level nodes in a second, middle layer of the knowledge graph based on the responses to the one or more sub-questions, performing a multi-hop query to identify one or more instance-level nodes in a third layer of the knowledge graph, and outputting text data corresponding to the one or more instance-level nodes as an answer to the prompt for the agricultural food product in the turn-based dialog session via the prompt interface.

In this aspect, additionally or alternatively, the method may further comprise including in the knowledge graph sub-graphs with data related to factor ontology, decision making, and market options.

In this aspect, additionally or alternatively, the method may further comprise configuring the first layer of the knowledge graph as an ontology-level layer that contains factorial entities related to sales of the agricultural food product.

In this aspect, additionally or alternatively, the method may further comprise including in the second, middle layer of the knowledge graph logic from agricultural regulations and subject matter experts for decision making.

In this aspect, additionally or alternatively, the method may further comprise configuring the third layer of the knowledge graph as an instance-level layer that contains specific diversified market options for the agricultural food product and their respective locations.

In this aspect, additionally or alternatively, the method may further comprise identifying, via the one or more sub-questions, factors relating to at least one of economic structure, location of a growing facility, certification of the growing facility, and type of the agricultural food product.

In this aspect, additionally or alternatively, the method may further comprise, at a retrieval model, querying, the knowledge graph, and generating the one or more sub-question prompts.

In this aspect, additionally or alternatively, the method may further comprise configuring the retrieval model as a retrieval-augmented generation model.

Another aspect provides a computing system for interactive prompting for an industrial product supply chain. The computing system may comprise a computing device including processing circuitry configured to execute instructions using portions of associated memory to implement an interactive prompting program. The processing circuitry may be configured to obtain domain constructed ontologies related to an industrial product from open source data and user private data and construct a knowledge graph based on the ontologies. In an inference phase, the processing circuitry may receive a prompt for the industrial product via a prompt interface in a turn-based dialog session. In response to the prompt, the processing circuitry may identify at least one ontology-level node in a first layer of the knowledge graph that matches information in the prompt and generate, via a retrieval-augmented generation model, one or more sub-question prompts to identify factors relating to at least one of economic structure, location of a production facility, certification of the production facility, and type of the industrial product. The processing circuitry may input the one or more sub-question prompts to a large language model, and, in response, receive as output from the large language model one or more sub-questions. The processing circuitry may output the one or more sub-questions for display in the turn-based dialog session via the prompt interface and receive responses to the one or more sub-questions in the turn-based dialog session via the prompt interface. The processing circuitry may identify one or more second-level nodes in a second, middle layer of the knowledge graph based on the responses to the one or more sub-questions, perform a multi-hop query to identify one or more instance-level nodes in a third layer of the knowledge graph, and output text data corresponding to the one or more instance-level nodes as an answer to the prompt for the agricultural food product in the turn-based dialog session via the prompt interface.

In this aspect, additionally or alternatively, the computing system may further comprise a retrieval-augmented generation model configured to query the knowledge graph and generate the one or more sub-question prompts.

In this aspect, additionally or alternatively, the prompt is a question regarding where the industrial product can be sold. The first layer of the knowledge graph may be configured as an ontology-level layer that contains factorial entities related to sales of the industrial product. The second, middle layer of the knowledge graph may include logic from industrial regulations and subject matter experts for decision making. The third layer of the knowledge graph may be configured as an instance-level layer that contains specific diversified market options for the industrial product and their respective locations.

"And/or" as used herein is defined as the inclusive or V, as specified by the following truth table:

| A | B | A $\lor$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for interactive prompting for an agricultural food product supply chain, the computing system comprising:
 a computing device including processing circuitry configured to execute instructions using portions of associated memory to implement an interactive prompting program, wherein the processing circuitry is configured to:
  obtain domain constructed ontologies related to an agricultural food product from a plurality of data sources;
  generate text data for the domain constructed ontologies;
  tokenize the text data for the domain constructed ontologies;
  generate embeddings from the tokenized text data to construct a knowledge graph based on the ontologies; and
  store the knowledge graph in a vector database, and
 in an inference phase:
  receive a prompt for the agricultural food product via a prompt interface in a turn-based dialog session;
  in response to the prompt, identify at least one ontology-level node in a first layer of the knowledge graph that matches information in the prompt;
  generate one or more sub-question prompts based on the at least one ontology-level node;

input the one or more sub-question prompts to a large language model, and, in response, receive as output from the large language model one or more sub-questions;
  output the one or more sub-questions for display in the turn-based dialog session via the prompt interface;
  receive responses to the one or more sub-questions in the turn-based dialog session via the prompt interface;
  identify one or more second-level nodes in a second, middle layer of the knowledge graph based on the responses to the one or more sub-questions;
  perform a multi-hop query to identify one or more instance-level nodes in a third layer of the knowledge graph; and
  output text data corresponding to the one or more instance-level nodes as an answer to the prompt for the agricultural food product in the turn-based dialog session via the prompt interface, wherein
 the prompt and the one or more sub-question prompts are received as text input,
 the text input is tokenized, and
 embeddings generated from the tokenized text input are used to query the vector database to identify nodes in the knowledge graph.

2. The computing system of claim 1, further comprising:
 a retrieval model configured to query the knowledge graph and generate the one or more sub-question prompts.

3. The computing system of claim 2, wherein
 the retrieval model is a retrieval-augmented generation model.

4. The computing system of claim 1, wherein
 the prompt is a question regarding where the agricultural food product can be sold.

5. The computing system of claim 1, wherein
 the first layer of the knowledge graph is configured as an ontology-level layer that contains factorial entities related to sales of the agricultural food product.

6. The computing system of claim 1, wherein
 the second, middle layer of the knowledge graph includes logic from agricultural regulations and subject matter experts for decision making.

7. The computing system of claim 1, wherein
 the third layer of the knowledge graph is configured as an instance-level layer that contains specific diversified market options for the agricultural food product and their respective locations.

8. The computing system of claim 1, wherein
 the one or more sub-questions identifies factors relating to at least one of a location of a growing facility, a certification of the growing facility, or a type of the agricultural food product.

9. The computing system of claim 1, wherein
 the knowledge graph is constructed using open source data and user private data.

10. A method for interactive prompting for an agricultural food supply chain, the method comprising, at a computing device including processing circuitry and memory:
 obtaining domain constructed ontologies related to an agricultural food product from a plurality of data sources;
 generating text data for the domain constructed ontologies;
 tokenizing the text data for the domain constructed ontologies;

generating embeddings from the tokenized text data to construct a knowledge graph based on the ontologies; and storing the knowledge graph in a vector database, and in an inference phase:

receiving a prompt for the agricultural food product in a turn-based dialog session via a prompt interface;

in response to the prompt, identifying at least one ontology-level node in a first layer of the knowledge graph that matches information in the prompt;

generating one or more sub-question prompts based on each of the at least one ontology-level node;

inputting the one or more sub-question prompts to a large language model, and receiving as output one or more sub-questions according to the one or more sub-question prompts;

outputting the one or more sub-questions for display in the turn-based dialog session via the prompt interface;

receiving responses to the one or more sub-questions in the turn-based dialog session via the prompt interface;

identifying one or more second-level nodes in a second, middle layer of the knowledge graph based on the responses to the one or more sub-questions;

performing a multi-hop query to identify one or more instance-level nodes in a third layer of the knowledge graph; and outputting text data corresponding to the one or more instance-level nodes as an answer to the prompt for the agricultural food product in the turn-based dialog session via the prompt interface, wherein the prompt and the one or more sub-question prompts are received as text input, the text input is tokenized, and embeddings generated from the tokenized text input are used to query the vector database to identify nodes in the knowledge graph.

11. The method of claim 10, the method further comprising:

at a retrieval model, querying, the knowledge graph, and generating the one or more sub-question prompts.

12. The method of claim 11, the method further comprising:

configuring the retrieval model as a retrieval-augmented generation model.

13. The method of claim 10, the method further comprising:

including in the knowledge graph sub-graphs with data related to factor ontology, decision making, and market options.

14. The method of claim 10, the method further comprising:

configuring the first layer of the knowledge graph as an ontology-level layer that contains factorial entities related to sales of the agricultural food product.

15. The method of claim 10, the method further comprising:

including in the second, middle layer of the knowledge graph logic from agricultural regulations and subject matter experts for decision making.

16. The method of claim 10, the method further comprising:

configuring the third layer of the knowledge graph as an instance-level layer that contains specific diversified market options for the agricultural food product and their respective locations.

17. The method of claim 10, the method further comprising:

identifying, via the one or more sub-questions, factors relating to at least one of a location of a growing facility, a certification of the growing facility, or a type of the agricultural food product.

18. A computing system for interactive prompting for an industrial product supply chain, the computing system comprising:

a computing device including processing circuitry configured to execute instructions using portions of associated memory to implement an interactive prompting program, wherein the processing circuitry is configured to:

obtain domain constructed ontologies related to an industrial product from open source data and user private data; and construct a knowledge graph based on the ontologies, and in an inference phase:

receive a prompt for the industrial product via a prompt interface in a turn-based dialog session;

in response to the prompt, identify at least one ontology-level node in a first layer of the knowledge graph that matches information in the prompt;

generate, via a retrieval-augmented generation model, one or more sub-question prompts to identify factors relating to at least one of an economic structure, a location of a production facility, a certification of the production facility, or a type of the industrial product;

input the one or more sub-question prompts to a large language model, and in response receive as output from the large language model one or more sub-questions;

output the one or more sub-questions for display in the turn-based dialog session via the prompt interface;

receive responses to the one or more sub-questions in the turn-based dialog session via the prompt interface;

identify one or more second-level nodes in a second, middle layer of the knowledge graph based on the responses to the one or more sub-questions;

perform a multi-hop query to identify one or more instance-level nodes in a third layer of the knowledge graph; and output text data corresponding to the one or more instance-level nodes as an answer to the prompt for the industrial product in the turn-based dialog session via the prompt interface, wherein the first layer of the knowledge graph is configured as an ontology-level layer that contains factorial entities related to sales of the industrial product, the second, middle layer of the knowledge graph includes logic from industrial regulations and subject matter experts for decision making, and the third layer of the knowledge graph is configured as an instance-level layer that contains specific diversified market options for the industrial product and their respective locations.

19. The computing system of claim 18, further comprising:

a retrieval-augmented generation model configured to query the knowledge graph and generate the one or more sub-question prompts.

20. The computing system of claim 18, wherein the prompt is a question regarding where the industrial product can be sold.

\* \* \* \* \*